United States Patent [19]
Kotch et al.

[11] Patent Number: 5,354,203
[45] Date of Patent: Oct. 11, 1994

[54] PORTABLE HYDRAULICS TRAINER

[75] Inventors: Richard J. Kotch, Macomb; John A. O'Brien, Waterford, both of Mich.

[73] Assignee: Vickers, Incorporated, Maumee, Ohio

[21] Appl. No.: 96,930

[22] Filed: Jul. 23, 1993

[51] Int. Cl.$^5$ .................. G09B 9/00; G09B 19/00; G09B 25/00
[52] U.S. Cl. .................. 434/126; 434/219
[58] Field of Search ............ 434/219, 126, 224, 365; 60/484

[56] References Cited

U.S. PATENT DOCUMENTS

| | | | |
|---|---|---|---|
| 2,882,618 | 4/1959 | Thompson . | |
| 3,047,964 | 8/1962 | Fried . | |
| 3,156,255 | 11/1964 | Gasquet et al. . | |
| 3,363,340 | 1/1968 | McKinley | 434/126 |
| 3,703,931 | 11/1972 | Page et al. | 172/4.5 |
| 3,842,517 | 10/1974 | LaChance . | |
| 3,898,555 | 8/1975 | Tellerman | 324/34 D |
| 4,201,051 | 5/1980 | Hall | 60/407 |
| 4,475,442 | 10/1984 | Breeden | 91/461 |
| 4,553,734 | 11/1985 | Oka et al. | 251/58 |
| 4,650,425 | 3/1987 | McGarry | 434/219 |
| 4,745,744 | 5/1988 | Cherry et al. | 60/368 |
| 4,757,747 | 7/1988 | Blatter et al. | 91/362 |
| 4,813,335 | 3/1989 | Wakiya et al. | 91/361 |
| 5,009,067 | 4/1991 | Bonnell | 60/484 |
| 5,178,543 | 1/1993 | Semans et al. | 434/218 |

FOREIGN PATENT DOCUMENTS 2012695 of 0000 United Kingdom .

OTHER PUBLICATIONS

ECC, The Training Company, Jan. 1977, "Aviation Week and Space Technology".
Vickers, "Portable Hydraulics Trainer", Bulletin C-2100 (1967).
Vickers catalog entitled "Hydraulics Plus Electronics Systems and Components" (1985).
Vickers Catalog U.S. 4650-5.0-0.4-1, Apr. 1989, "EHT1 Portable Electrohydraulic Trainer".
Vickers Catalog TC-018-H92C "Vickers Training Center", Aug./Sep. 1992.
Vickers Catalog 400A "Hydraulics & Electronics Systems and Components" 1992, pp. F8-9, K33, K25-28, K11-18, M3-4, J51-60, F61-66, F76-80, G5-9, J9-11, D4-6, D19-21, N3-4, R3-6.
Vickers Technical Bulletin GB-V-441, Apr. 1990, "Proportional Pressure relief Valve, with Integrated Electronics".

Primary Examiner—Paul J. Hirsch
Assistant Examiner—Cindy A. Cherichetti
Attorney, Agent, or Firm—Barnes, Kisselle, Raisch, Choate, Whittemore & Hulbert

[57] ABSTRACT

Apparatus for training an operator in use of hydraulic and electrohydraulic fluid power systems that includes a vertical panel upstanding from a wheeled base. A first plurality of electrohydraulic devices are mounted on one side of the panel, and second plurality of hydromechanical devices are mounted on the opposing side of the panel. Both of the device pluralities include fluid flow control valves that are distinct from each other between the respective pluralities, and fluid load devices such as rotary hydraulic motors and linear hydraulic cylinders that are shared by the respective pluralities. A fluid power source is carried by the base, as are a multiplicity of hoses for connecting the fluid power source to the devices among either or both of the first and second pluralities. Thus, a hydromechanical trainer and an electrohydraulic trainer are provided in a single device with shared components for loading the valves of the respective training sections, which may be used simultaneously.

18 Claims, 6 Drawing Sheets

PORTABLE HYDRAULICS TRAINER

The present invention is directed to hydraulic fluid power systems, and more particularly to apparatus for training an operator in theory and operation of hydraulic equipment and electrohydraulic equipment with associated control electronics.

BACKGROUND AND OBJECTS OF THE INVENTION

Apparatus has heretofore been marketed by applicants' assignee for use as a training aid in theory and operation of hydromechanical fluid power systems. In such apparatus, a plurality of hydromechanical devices, such as fluid-powered hydraulic motors, valves and cylinders, are mounted on a vertical panel carried by a wheeled frame. A hydraulic pump is carried by the frame, and is selectively connectable by quick-disconnect hoses to one or more of the hydromechanical devices. All components are standard industrial devices with which the laboratory or classroom trainee thus becomes familiar through a series of exercises or problems set by an instructor or instruction manual. For training in electrohydraulics, which represents the current trend in the fluid power industry, an electrohydraulic servo trainer module has been provided as a separate unit or as an accessory to the standard hydromechanical trainer.

U.S. Pat. No. 5,009,067 assigned to the assignee hereof discloses apparatus for training an operator in theory and practice of electrohydraulic control systems. The apparatus includes a plurality of electrohydraulic devices for performing hydraulic operations as differing functions of associated electronic control signals. A plurality of differing electronic controllers are adapted to generate electronic control signals to operate the electrohydraulic devices. The electronic controllers bear graphic indicia identifying the controller and associating each controller with corresponding electrohydraulic devices on the training unit. Each controller has a plurality of available input, output and control connections, which may be selectively interconnected with each other and with the electrohydraulic devices by suitable cables for configuring the controller and associated device in a multiplicity of differing operating modes. The electrohydraulic devices are connectable by quick-disconnect hoses to a fluid power source carried by the trainer, and are associated with indicia for generating a visually observable indication of operation of the devices, so that an operator can observe effects of differing electronic control configurations on the devices.

Although the apparatus described above and disclosed in the noted patent have met with substantial acceptance and success in both the academic and the industrial training environments, further improvements remain desirable. In particular, in order to obtain complete training in both hydromechanical and electrohydraulic fluid power systems, the training centers must have at least one training apparatus of each type. The hydraulic load devices in the prior art, such as the rotary hydraulic motors and linear motors or actuators, are not dynamically loaded, so that operation during training is not as realistic as desired. It is therefore a general object of the present invention to provide a fluid power training apparatus of the described character that is more versatile in terms of capability for training a student or technician in a wide variety of fluid power control techniques, that forms an integral unit with which the trainee can readily become familiar, and in which the electronic control modules are constructed and arranged realistically to simulate situations that the trainee may encounter in the field while at the same time providing enhanced trainee understanding of electronic control theory and practice.

SUMMARY OF THE INVENTION

Apparatus for training an operator in use of hydraulic and electrohydraulic fluid power systems in accordance with a presently preferred embodiment of the invention includes a vertical panel upstanding from a wheeled base. A first plurality of electrohydraulic devices are mounted on one side of the panel, and second plurality of hydromechanical devices are mounted on the opposing side of the panel. Both of the device pluralities include fluid flow control valves that are distinct from each other between the respective pluralities, and fluid load devices such as rotary hydraulic motors and linear hydraulic motors (cylinders) that are shared by the respective pluralities. A fluid power source is carried by the base, as are a multiplicity of hoses for connecting the fluid power source to the devices among either or both of the first and second pluralities. Thus, a hydromechanical trainer and an electrohydraulic trainer are provided in a single apparatus with shared components for loading the valves of the respective training sections, which may be used simultaneously.

Each of the flow control valves in both of the electrohydraulic and hydromechanical pluralities is mounted on a manifold that is carried on an associated side of the panel. Quick-disconnect couplings are mounted on each such manifold for fluid communication with the associated valve through passages in the manifold, and for connection to each other and to the motors through quick-disconnect hoses. The fluid power source feeds a manifold carried by the wheeled base beneath each side of the panel, with quick-disconnect couplings on each such power source manifold for feeding fluid under pressure to the flow control valves on each side of the panel. The fluid power source includes an electric motor coupled to a hydraulic pump for supplying fluid under pressure to the source manifolds, and the manifolds are also coupled to return fluid to the sump. A filter cleans fluid circulated by the pump.

The hydraulic load devices shared by the hydromechanical and electrohydraulic valve pluralities include both rotary and linear hydraulic motors—i.e., rotary hydraulic motors and linear hydraulic motors (cylinders). The rotary hydraulic motor employed as a load device is coupled to a second rotary hydraulic motor for dynamic loading during operation. One linear actuator employed as a load device is coupled to a second opposing actuator for dynamic loading during operation, and a second linear actuator is coupled to a suspended weight for dynamic loading during operation. Plates are mounted on the vertical panel adjacent to each of the valves and motors, and bear a schematic diagram of the associated adjacent device. The apparatus seeks to train the student in use of components from a predetermined system product line, and the plates additionally bear indicia for identifying the adjacent associated device within such product line.

The electrohydraulic valves are responsive to electronic control signals for controlling fluid flow, and an electronic controller is carried by the base adjacent to the vertical panel beneath the electrohydraulic valves and is responsive to an operator for generating such control signals. At least some of the valves and/or motors among the electrohydraulic devices include sensors for generating feedback signals as a function of operation thereof, and the electronic controller includes facility for generating the control signals as a function of such feedback signals. The electronic controller includes facility for removably receiving a plurality of preassembled electronic control assemblies that each include a circuitboard bearing control electronics, a panel at one edge bearing graphic indicia identifying the operating characteristics of the assembly, and a connector at the opposing edge for connection to the control electronics on the circuitboard. A special board within the controller makes connection with the connector of the circuitboard, and brings the connections to terminals on the controller operator panel. Electronic cables are employed for connecting such terminals to the electrohydraulic devices for applying control signals to such devices and returning feedback sensor signals from the devices to the control electronics.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
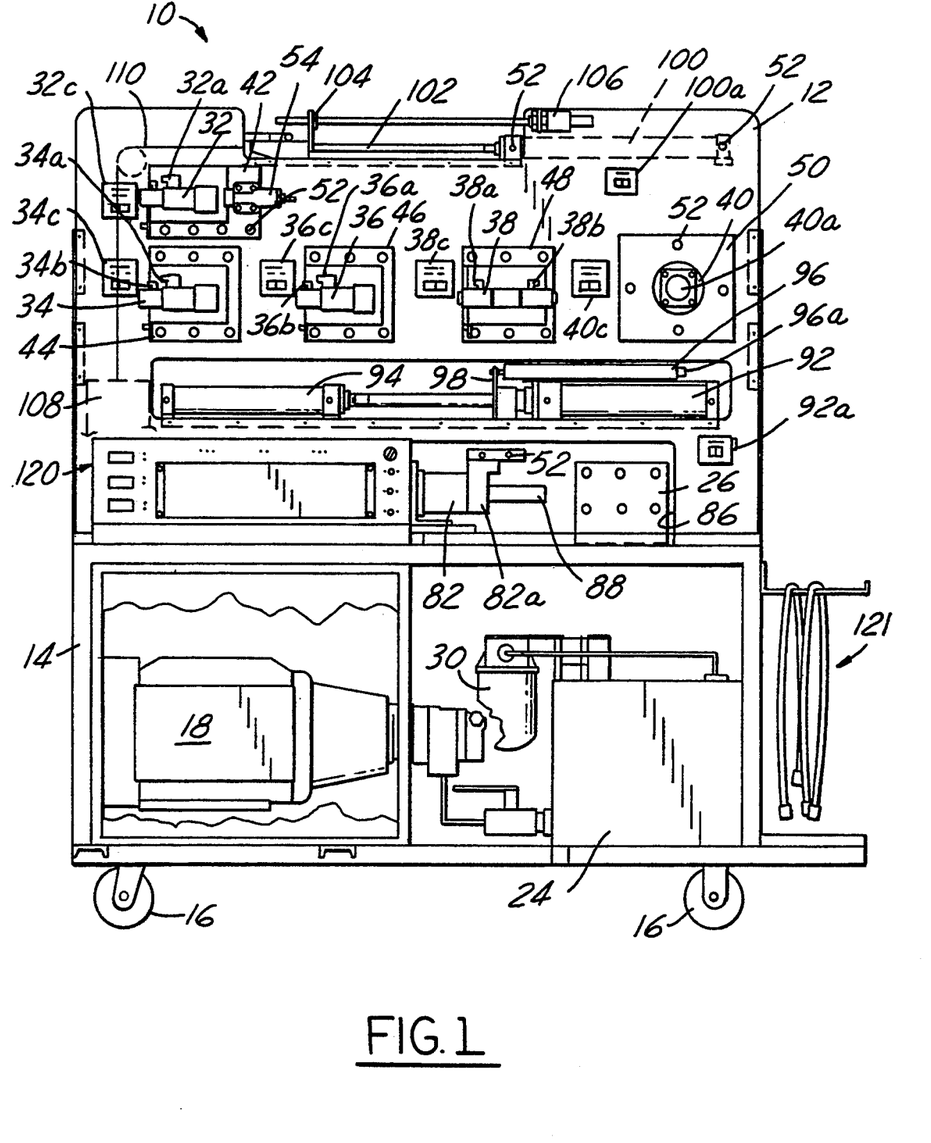
FIG. 1 is a front elevational view of a hydraulic fluid power trainer in accordance with a presently preferred embodiment of the invention illustrating the electrohydraulic side of the trainer.
Figure 2:
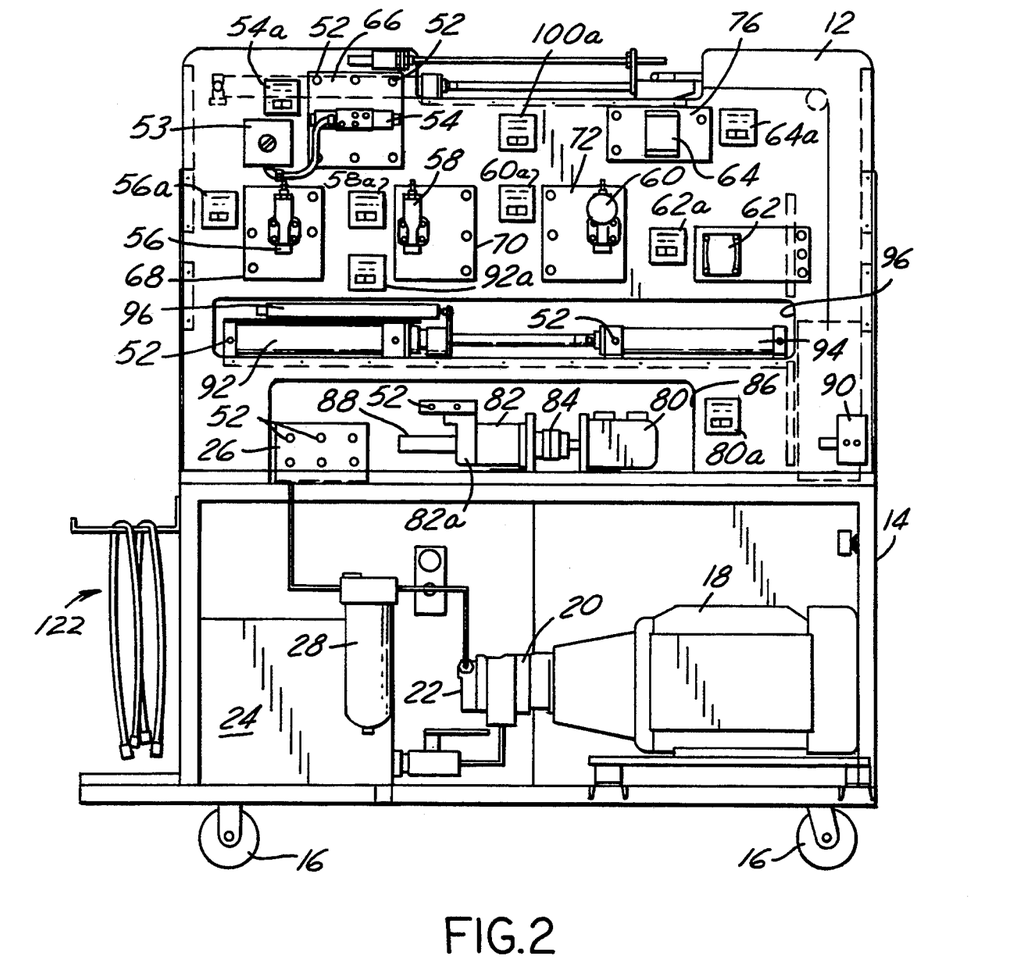
FIG. 2 is a rear elevational view of the trainer in FIG. 1 illustrating the hydromechanical side of the trainer.
Figure 3:
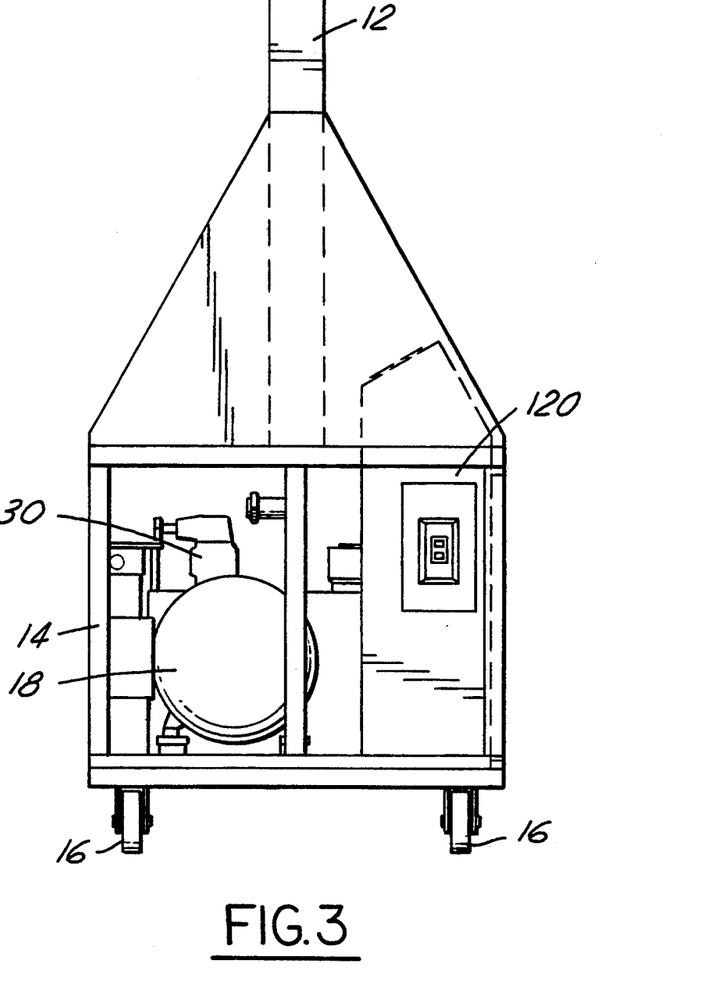
FIG. 3 is a side elevational view of the trainer illustrated in FIGS. 1 and 2.
Figure 4A:
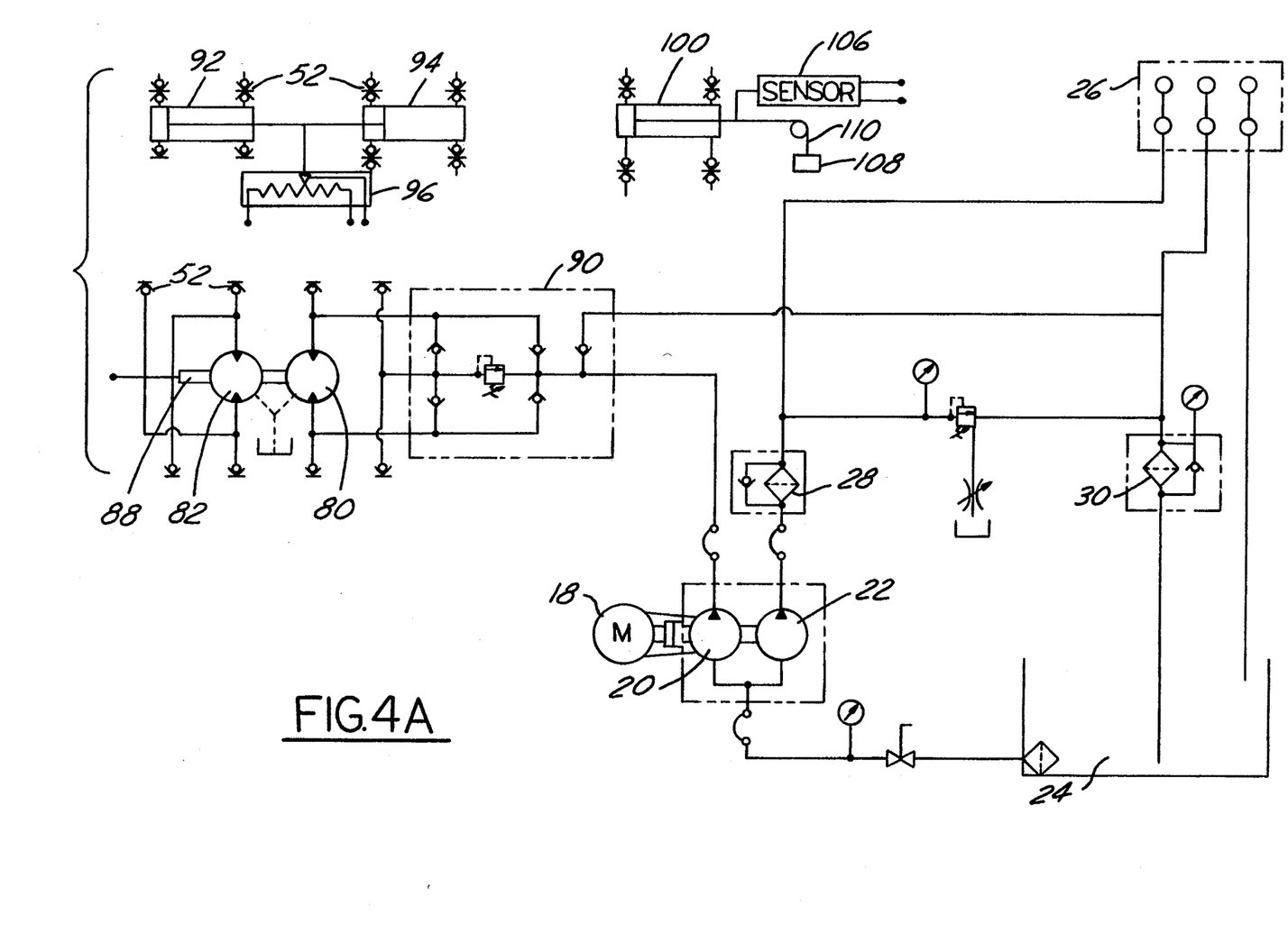
FIGS. 4A–4L together comprise a schematic diagram of the hydromechanical and electrohydraulic devices in the apparatus of FIGS. 1–3.
Figure 4B:
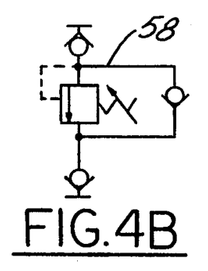
Figure 4C:
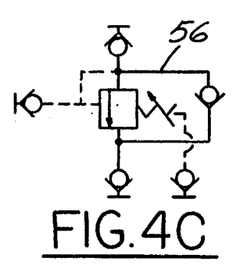
Figure 4D:
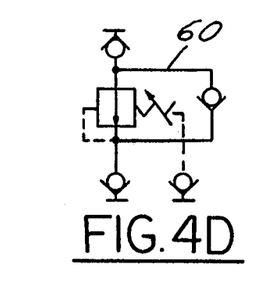
Figure 4E:
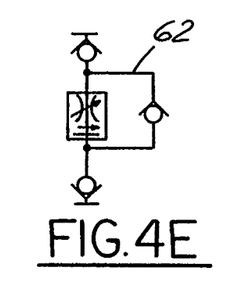
Figure 4F:
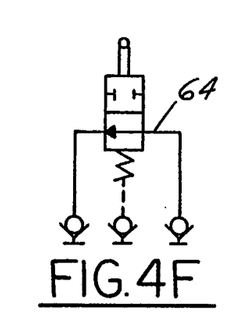
Figures 4G, 4H:
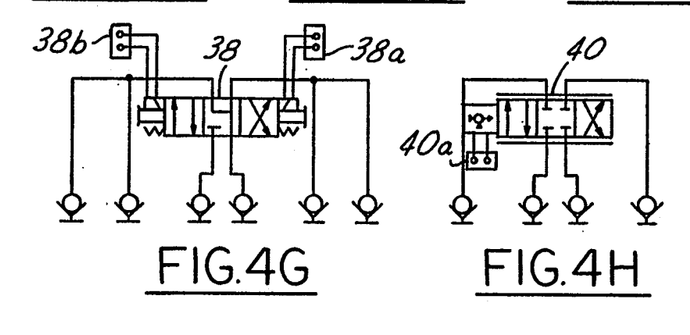
Figure 4I:
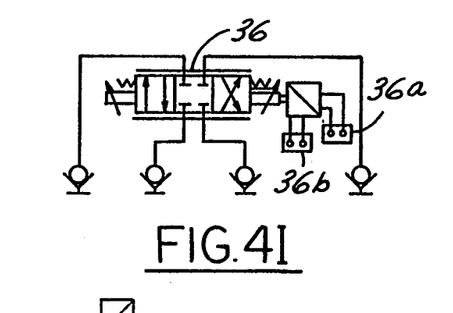
Figure 4J:
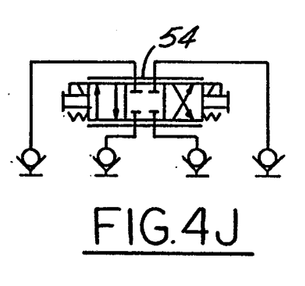
Figure 4K:
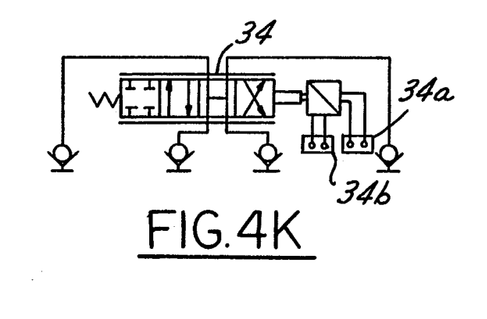
Figure 4L:
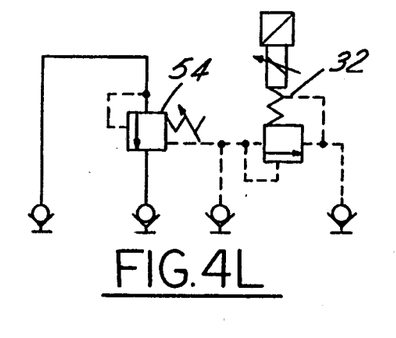

The drawings illustrate a fluid power trainer 10 in accordance with a presently preferred embodiment of the invention as comprising a hollow vertical panel 12 upstanding from a generally rectangular base 14 that is supported by four casters 16. Within base 14 is an electric motor 18 that is coupled to a pair of vane pumps 20,22. Pumps 20,22 draw fluid from a sump 24 within base 14, and feed fluid under pressure to quick-disconnect male couplings on a pair of manifolds 26, which are supported on base 14 beneath the respective sides of panel 12 as best seen in FIGS. 1 and 2. Manifolds 26 also include quick-disconnect couplings for returning fluid to sump 24, as best seen in FIG. 4A. A filter 28 (FIGS. 2 and 4A) is connected between the outlet of pump 22 and manifold 26, and a second filter 30 (FIGS. i and 4A) connected in the return line between manifold 26 and sump 24.

On one side of panel 12, there are mounted a plurality of electrohydraulic flow control valves illustrated in FIGS. 1 and 4G–4L. These valves include an electrohydraulic proportional relief valve 32, a solenoid-operated proportional valve 34, two proportional directional valves 36,38 and a servo valve 40. Each valve 32–40 is separately mounted an associated manifold plate 42–50 carried by panel 12. The manifold plates 42–50 have internal passages that connect the fluid inlet and outlet ports of the associated valves to male quick-disconnect fittings or couplings 52 disposed along the edges of the respective manifolds. Manifold plate 42 also connects valve 32 to a pilot valve 54. Each of the valves 32–40 is solenoid-operated, and has female electrical terminals 32a,34a,36a,38a and 38b, and 40a for electrical connection to the control electronics to be described to supply valve control signals to the valve-operating solenoids. Valves 34 and 36 also include internal LVDT sensors coupled to associated female terminals 34b and 36b to provide sensor feedback signals to the control electronics. A plate 32c,34c,36c,38c and 40c is mounted on panel 12 adjacent to each associated valve 32–40 bearing a graphic schematic illustration of the associated valve, as well as alphanumeric indicia identifying the valve by model number (see Table I) in the product line of the training apparatus.

On the opposing side of panel 12 there are mounted a plurality of hydromechanical valves illustrated in FIGS. 2 and FIGS. 4A–4F. These valves include a directional valve 54 coupled to a switch 53 for controlling direction of flow through valve 54, a sequencing valve 56, a counterbalancing valve 58, a pressure reducing valve 60, a flow control valve 62 and a deceleration valve 64. Each of the valves 54–64 is mounted on an associated manifold plate 66–76 affixed to panel 12 and containing internal passages connecting the ports of the associated valve to male quick-disconnect fittings 52 disposed along the edges of the manifolds. A plate 54a–64a is disposed on panel 12 immediately adjacent to each associated valve 54–64, bearing a schematic illustration of the associated valve and an alphanumeric identification of the valve by model number (see Table I).

Fluid power load components or devices are also mounted on panel 12, and are shared between the electrohydraulic (FIG. 1) and hydromechanical (FIG. 2) sides of the trainer through apertures in the panel. These components include a balanced vane motor 80 and an inline piston servo motor 82, each having a rotary output shaft that is connected to the other by a coupling 84. Motors 80,82 are mounted on base 14 within an aperture 86 in panel 12, with an associated plate 80a being positioned on the panel adjacent to the aperture with schematic illustration of the motors and alphanumeric identification of model number. A tachometer 88 is also coupled to motor 82 for providing an electrical signal as a function of speed of motor shaft rotation. Male quick-disconnect couplings 52 are mounted on a manifold 82a that projects from motor 82 with internal passages for feeding fluid to the motor. Motor 80 is connected (FIG. 4A) to a load block 90 on panel 12 having adjustable relief valves for adjusting load on motor 80. Motor 82 thus acts as a drive motor for use by the trainer operator, and motor 80 functions as a dynamic load on motor 82, with the load being adjustable by means of load block 90.

A pair of cylinders 92,94 are mounted in opposition to each other within panel 12, and are accessible from both sides of panel 12 through openings 96. Each cylinder 92,94 has a male quick-disconnect couplings 52 at both ends accessible from both sides of panel 12 for connection to fluid manifold 26 and/or flow control valves.

Thus, the actuators may be employed for either electrohydraulic or hydromechanical training purposes. A variable resistance position sensor 96 is carried by cylinder 92, and is coupled by a bracket 98 to the interconnected actuator shafts. A female electrical connector 96a on sensor 96 provides an electrical signal as a function of position of the interconnected actuator shafts. The shafts of opposed cylinders 92,94 are coupled to each other, and either actuator may be coupled to load block 90 to function as an adjustable load on the other. An upper cylinder or actuator 100 is mounted on panel 12, again having male quick-disconnect couplings 52 at each end of the cylinder accessible from both sides of panel 12. The actuator rod 102 that projects from cylinder 100 is coupled by a bracket 104 to the shaft of a position sensor 106. Bracket 104 also connects the actuator rod to a weight 108 suspended by a cable 108 within panel 12 to provide dynamic loading on cylinder 100. Plates 92a and 100a are mounted on both sides of panel 12 adjacent to cylinders 92,100 bearing schematic illustrations and model identification (Table I) thereof. Hoses 121 with female quick-disconnect couplings are provided for selective operator interconnection of the various valves, actuators or cylinders and source manifolds 26.

Figure 5:
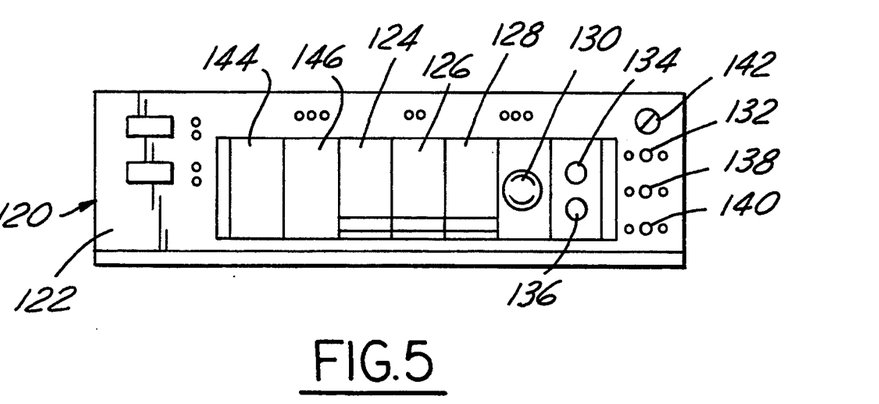
FIG. 5 is a fragmentary elevational view of the electronic controller in the training apparatus of FIGS. 1–3.
Figure 6A:
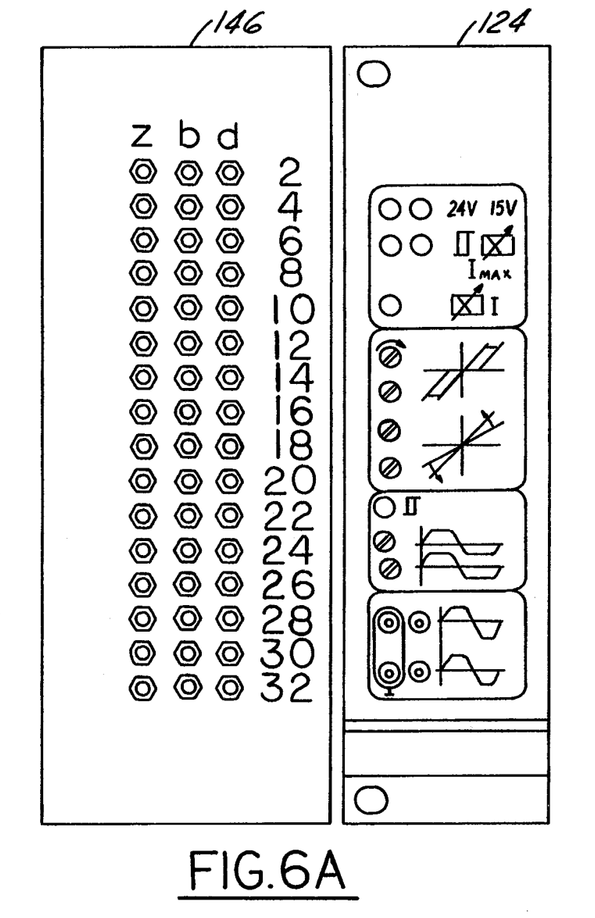
FIGS. 6A and 6B illustrate electronic card/connector arrangements on the controller of FIG. 5.
Figure 6B:
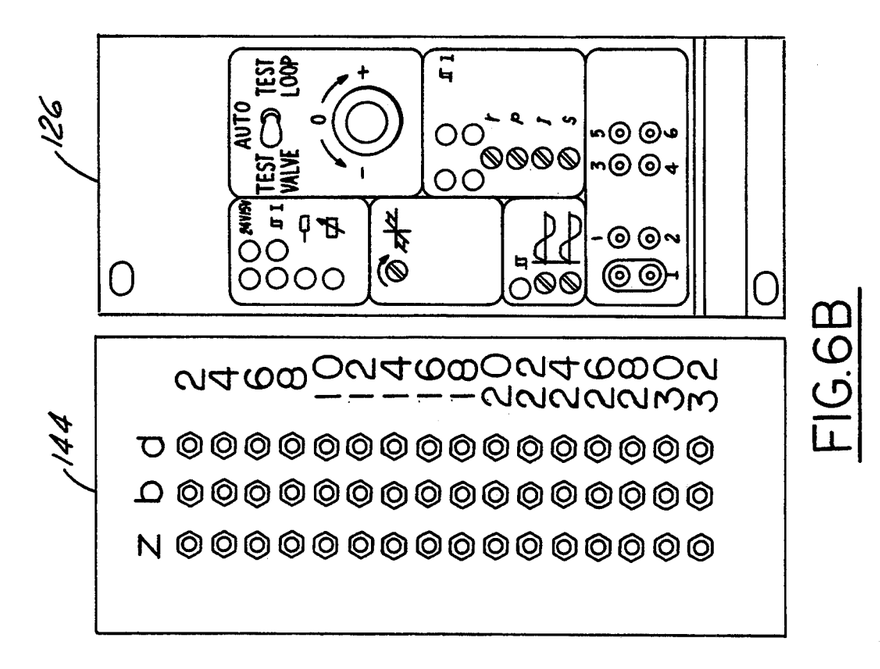

An electronic controller enclosure 120 (FIGS. 1 and 5) is mounted on base 14 beneath and in front of the electrohydraulic side of panel 12 as illustrated in FIG. 1. Enclosure 120 has a sloping operator panel 122 with an aperture in which there are mounted several preassembled amplifier cards 124,126 and 128. An operator joystick 130 is internally connected to female terminals 132 on panel 122, as are a pair of potentiometers 134,136 connected to sets of female terminals 138,140. A power on/off switch 142 on panel 122 selectively applies power to the amplifier cards. One or more of cards 124–128 are connected within enclosure 120 to connector panels 144,146 on panel 122 to facilitate connection to the card electronics. Preferably, each card 124,126,128 is of the type having a front panel, exposed at panel 122, identifying the card to an operator, and a connector at the remote edge for connection to the electronics. This connection is removably plugged into a mating fixed connector within enclosure 120 that is connected to panel 144 or 146 so as to bring the card connector terminals out to the front panel. Typical card/connector panel arrangements are illustrated in FIGS. 6A and 6B. Cards 124–128 may thus be selectively replaced, and enclosure 120 used for training in multiple electrohydraulic setups. The female connector terminals on connector panels 144,146 are selectively connectable to the various sensors and valve coils (FIGS. 4A–4L) by cables with male connectors provided with the unit to configure the unit in training arrangements set by an instructor or manual.

In accordance with an important feature of the present invention, all of the hydromechanical and electrohydraulic equipment and the controllers of training apparatus 10 comprise standard industrial components, in this case components of the fluid power equipment product line of applicants' assignee selected as being representative for training purposes. The following Table correlates the hydromechanical devices, the electrohydraulic devices the load devices and the controllers hereinabove identified with specific equipment marketed by applicants' assignee:

TABLE I

| Device/Controller | Vickers Model No. |
| --- | --- |
| Proportional valve 32 | EHST3BVE11 |
| Pilot valve 54 | CG-03-B-10 |
| Proportional valve 34 | KSDG4V-3 |
| Directional valve 36 | KFDGV3 |
| Directional valve 38 | KDGV32 |
| Servo valve 40 | SM4207 |
| Directional valve 54 | DG4V3S6 |
| Sequencing valve 56 | RCG03D23 |
| Counterbalancing valve 58 | RCG-03-A1-30 |
| Reducing valve 60 | XCG-03-1B-30 |
| (?) valve 62 | FCG-02-300-50 |
| Deceleration valve 64 | DG1652 |
| Motor 80 | M2230251A13 |
| Motor 82 | MFB5-FU-20-S61 |
| Load block 90 | BKM0D617 |
| Actuator 92 | TF02EAWB3 |
| Actuator 94 | TF02DAGB3 |
| Cylinder 100 | TF02CKB3 |
| Power amplifier 126 | EEA-PAM-118 |
| Amplifier Module 124 | EM-D-30 |
| Amplifier Module 128 | EM-D-20 |

As previously noted, the devices and controllers listed in Table I are standard components heretofore marketed by applicants' assignee. These components are illustrated, for example in Vickers Catalog 400A "Hydraulics & Electronics Systems and Components" (1992). Position sensor 36 is marketed by Temposonics, Inc. of Plainview, New York and disclosed in U.S. Pat. No. 3,898,555. The disclosures of the noted catalog relative to the devices enumerated in Table I, and of the noted U.S. patent, are incorporated herein by way of background. The other components hereinabove described are standard items.

There has thus been provided in accordance with the present invention a combined hydromechanical and electrohydraulic training apparatus that fully satisfies all of the objects and aims previously set forth. Different types of electronically controlled hydraulic apparatus and hydromechanical apparatus are mounted on respective sides of a vertical panel readily accessible to the trainee, and load apparatus are also mounted on or at the vertical panel and shared by both the electrohydraulic and hydromechanical flow control devices. All of the devices are selectively interconnectable with quick-disconnect lines and the like.

We claim:
1. Apparatus for training an operator in use of hydraulic and electrohydraulic systems comprising:
a vertical panel upstanding from a base,
a first plurality of electrohydraulic devices mounted on one side of said panel,
a second plurality of hydromechanical devices mounted on an opposing side of said panel,
both of said pluralities including fluid flow control devices distinct from each other between the respective pluralities and fluid load devices shared by the respective pluralities,
a fluid power source carried by said base, and
means for selectively connecting said fluid power source to devices among either or both of said first and second pluralities.

2. The apparatus set forth in claim 1 wherein each of said flow control devices in both of said pluralities is mounted on a manifold carried on an associated side of said panel, and wherein said selectively-connecting means comprises quick-disconnect couplings on each said device manifold for fluid communication with the associated device through the associated said manifold.

3. The apparatus set forth in claim 2 wherein said fluid power source includes a fluid power source manifold carried by said base beneath each side of said panel, and quick-disconnect couplings on each said power source manifold for feeding fluid under pressure to the said devices on the associated side of said panel.

4. The apparatus set forth in claim 3 wherein said fluid power source includes an electric motor, hydraulic-pump means coupled to said motor for supplying fluid under pressure to said source manifolds, and means coupled to said source manifold for return of fluid to said sump.

5. The apparatus set forth in claim 4 wherein said fluid power source further includes means for filtering circulated by said pump means.

6. The apparatus set forth in claim 1 wherein said fluid load devices shared by said pluralities include means responsive to fluid flow from said flow control devices for performing a mechanical motion, and means for resisting such mechanical motion for loading said fluid load devices.

7. The apparatus set forth in claim 6 wherein said fluid load devices include a first hydraulic motor having an output shaft movable in response to fluid flow through the motor, and wherein the said motion-resisting means associated with said first hydraulic motor comprises a second hydraulic motion having a shaft coupled to the shaft of said first motor for dynamically resisting motion of the same.

8. The apparatus set forth in claim 7 wherein both of said first and second motors have associated means for coupling to said flow control devices or to said source.

9. The apparatus set forth in claim 8 wherein said motion-resisting means further comprises a hydraulic load block for fluid coupling to said second motor to adjust fluid flow to and from said second motor and thereby adjust loading on said first motor.

10. The apparatus set forth in claim 8 wherein said first and second motors comprise rotary hydraulic motors.

11. The apparatus set forth in claim 8 wherein said first and second motors comprise linear hydraulic cylinders.

12. The apparatus set forth in claim 6 wherein said fluid load devices shared by said pluralities include a linear hydraulic actuator having an output shaft, and wherein said motion-resisting means comprises a suspended weight coupled to said shaft.

13. The apparatus set forth in claim 1 further comprising a plurality of means on each side of said panel adjacent to a corresponding said device bearing a hydraulic schematic diagram of the adjacent device.

14. The apparatus set forth in claim 13 for training an operator in use of components from a predetermined system product line, wherein said plurality of diagram-bearing means on each side of said panel further includes indicia for identifying the adjacent device within said product line.

15. The apparatus set forth in claim 1 wherein said flow control devices among said first plurality of electrohydraulic devices are responsive to electronic control signals for controlling fluid flow, and wherein said apparatus further comprises electronic control means carried by said base adjacent to said panel beneath said first plurality of electrohydraulic control means and responsive to an operator for generating said control signals.

16. The apparatus set forth in claim 15 wherein at least some of said first plurality of electrohydraulic devices include means for generating a feedback signal as a function of operation thereof, and wherein said electronic control means includes means for generating said control signals as a function of said feedback signals.

17. The apparatus set forth in claim 16 wherein said electronic control means includes means for removably receiving a plurality of preassembled electronic control assemblies that each include a circuitboard bearing control electronics, a panel at one edge bearing indicia identifying operating characteristics of the assembly and a connector at an opposing edge for connection to the control electronics on said circuitboard, and means for selective operator interconnection of such control electronics on said circuitboard to said electrohydraulic devices.

18. The apparatus set forth in claim 17 wherein said electronic control means includes a control enclosure having an operator panel, said means for removably receiving said assemblies including an aperture in said panel for receiving said assemblies to position said panel on each said assembly parallel and adjacent to said operator panel, and said means for selective interconnection comprising means within said enclosure for electrical connection with the said connector on each said assembly as it is received through said aperture and electrical connection means on said operation panel adjacent to the panel of such assembly electrically connected to said connector for operator connection to the control circuitry on said assembly.

* * * * *